United States Patent
Roh et al.

(10) Patent No.: US 12,390,888 B2
(45) Date of Patent: Aug. 19, 2025

(54) APPARATUS FOR MANUFACTURING A DISPLAY DEVICE AND A METHOD FOR MANUFACTURING THE DISPLAY DEVICE

(71) Applicant: SAMSUNG DISPLAY CO., LTD., Yongin-si (KR)

(72) Inventors: Jong Duk Roh, Yongin-si (KR); Kwang Min Lee, Goyang-si (KR); Jae Ku Han, Asan-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 95 days.

(21) Appl. No.: 17/406,226

(22) Filed: Aug. 19, 2021

(65) Prior Publication Data

US 2022/0143757 A1    May 12, 2022

(30) Foreign Application Priority Data

Nov. 10, 2020    (KR) .......................... 10-2020-0149383

(51) Int. Cl.
*B23K 26/40* (2014.01)
*B23K 101/36* (2006.01)
(Continued)

(52) U.S. Cl.
CPC .......... *B23K 26/40* (2013.01); *B29C 63/0013* (2013.01); *B23K 2101/36* (2018.08); *B23K 2103/42* (2018.08); *B29L 2031/3475* (2013.01)

(58) Field of Classification Search
CPC ............ B23K 2101/36; B23K 2103/42; B23K 26/06; B23K 26/062; B23K 26/0734;
(Continued)

(56) References Cited

U.S. PATENT DOCUMENTS

2012/0091105 A1* 4/2012 Ghandour ............. H01L 31/188
                                                          219/121.69
2018/0197777 A1* 7/2018 Karasaki ........... H01L 21/02076
(Continued)

FOREIGN PATENT DOCUMENTS

KR    10-2014-0015895 A    2/2014
KR    10-2018-0029739       3/2018
(Continued)

OTHER PUBLICATIONS

Office Action dated May 23, 2025 in corresponding Korean Patent Application No. 10-2020-0149383 (in Korean).

*Primary Examiner* — Dana Ross
*Assistant Examiner* — Adam M Eckardt
(74) *Attorney, Agent, or Firm* — F. CHAU & ASSOCIATES, LLC

(57) ABSTRACT

An apparatus for manufacturing a display device and a method for manufacturing a display device are provided. An embodiment of an apparatus for manufacturing a display device includes a laser module configured to emit a laser beam and a first optical system disposed on one side of the laser module such that the laser beam is provided to the first optical system, wherein the first optical system controls an energy profile of the laser beam, wherein, on a first irradiation surface positioned at one side in a traveling direction of the laser beam from a focal point of the laser beam, the energy profile of the laser beam includes a first increase and then a first decrease in energy along a line parallel to the first irradiation surface from an outer perimeter of the laser beam toward a center of the laser beam, and wherein the energy profile of the laser beam includes a first peak corresponding to where the energy begins to decrease.

17 Claims, 19 Drawing Sheets

(51) Int. Cl.
  *B23K 103/00*   (2006.01)
  *B29C 63/00*    (2006.01)
  *B29L 31/34*    (2006.01)

(58) Field of Classification Search
  CPC ........ B23K 26/36; B23K 26/38; B23K 26/40;
        B23K 26/402; B29C 63/0013; B29L
        2031/3475; G10H 1/00; G10H 1/053;
        G10H 1/34
  See application file for complete search history.

(56) References Cited

U.S. PATENT DOCUMENTS

| | | | | |
|---|---|---|---|---|
| 2019/0202005 | A1* | 7/2019 | Miura | B29C 48/0022 |
| 2019/0351505 | A1* | 11/2019 | O'Neill | B22F 12/44 |
| 2020/0101560 | A1* | 4/2020 | Sangu | B23K 26/0734 |
| 2020/0406397 | A1* | 12/2020 | Roh | B32B 37/18 |
| 2020/0406403 | A1* | 12/2020 | Domoto | B23K 26/0648 |
| 2021/0213565 | A1* | 7/2021 | Tano | B23K 26/147 |

FOREIGN PATENT DOCUMENTS

| | | |
|---|---|---|
| KR | 10-1960267 | 3/2019 |
| KR | 10-2020-0060654 | 6/2020 |
| KR | 10-2131091 | 7/2020 |

\* cited by examiner

APPARATUS FOR MANUFACTURING A DISPLAY DEVICE AND A METHOD FOR MANUFACTURING THE DISPLAY DEVICE

CROSS-REFERENCE TO RELATED APPLICATIONS

This application claims priority under 35 U.S.C. § 119 to Korean Patent Application No. 10-2020-0149383, filed on Nov. 10, 2020 in the Korean Intellectual Property Office, the disclosure of which is incorporated by reference herein in its entirety.

TECHNICAL FIELD

The present disclosure relates to an apparatus for manufacturing a display device and a method for manufacturing a display device.

DISCUSSION OF RELATED ART

The importance of display devices has steadily increased with the development of multimedia technology. In response thereto, various types of display devices such as an organic light emitting display (OLED), a liquid crystal display (LCD), and the like have been used. Such display devices have been applied to various mobile electronic devices, such as smart phones, smart watches, tablet PCs, and the like.

During the process for manufacturing a display device, a display panel may be protected by a protective film attached onto one surface. The protective film may be partially peeled off in certain cases.

SUMMARY

Aspects of the present disclosure provide an apparatus for manufacturing a display device and a method for manufacturing a display device capable of stably removing a protective film by providing uniform energy for each area along a line irradiated with a laser beam.

Aspects of the present disclosure also provide an apparatus for manufacturing a display device and a method for manufacturing a display device capable of minimizing damage to a substrate under a protective film when irradiation is performed with a laser beam on the substrate to which the protective film is attached.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

An embodiment of an apparatus for manufacturing a display device includes: a laser module configured to emit a laser beam; and a first optical system disposed on one side of the laser module such that the laser beam is provided to the first optical system, wherein the first optical system controls an energy profile of the laser beam, wherein, on a first irradiation surface positioned at one side in a traveling direction of the laser beam from a focal point of the laser beam, the energy profile of the laser beam includes a first increase and then a first decrease in energy along a line parallel to the first irradiation surface from an outer perimeter of the laser beam toward a center of the laser beam, and wherein the energy profile of the laser beam includes a first peak corresponding to where the energy begins to decrease.

An embodiment of a method for manufacturing a display device includes: preparing a laser device including a beam shaper configured to control an energy profile of a laser beam; preparing a substrate to which a protective film including a film portion and an adhesive portion is attached; irradiating a laser beam from the laser device through the protective film onto the substrate, wherein the irradiating removes the film portion and the adhesive portion, and wherein a spot of the laser beam on the protective film has a donut shape; and peeling a dummy area of the protective film.

According to one embodiment of the apparatus for manufacturing a display device and the method for manufacturing a display device, a laser beam having a controlled energy profile may be provided to an irradiation target. By doing so, it is possible to prevent excessive energy from being applied to the irradiation target. In addition, uniform energy may be provided for each area of the irradiation target when the laser beam is moved to perform the irradiation. By doing so, a protective film may be stably removed using the laser beam when the protective film is partially peeled.

According to the apparatus for manufacturing a display device and the method for manufacturing a display device according to one embodiment, a target substrate to which a protective film is attached may be irradiated with a laser beam for partial peeling of the protective film, including the film portion and the adhesive portion, so that the protective film may be penetrated in a thickness direction. In this case, an energy profile of the laser beam may be controlled to prevent damage to the target substrate disposed under the protective film.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it may be directly disposed on the other layer or substrate, or intervening layers may also be present. In contrast, when an element is referred to as being "directly on" another element, there are no intervening elements present.

Spatially relative terms, such as "beneath," "below," "lower," "above," "upper", and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass an orientation of both above and below. The device may be otherwise oriented (rotated 90 degrees or at other orientations), and the spatially relative descriptors used herein may be interpreted accordingly.

The same reference numbers may indicate the same components throughout the specification.

Hereinafter, embodiments will be described in detail with reference to the accompanying drawings.

Figure 1:
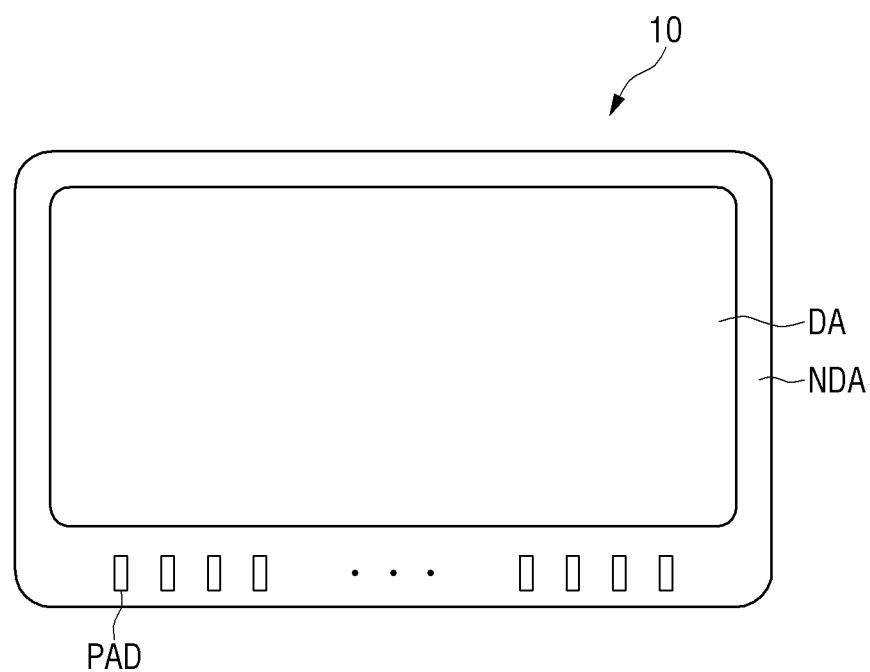
FIG. 1 is a plan view of a display panel according to one embodiment.
Figure 2:
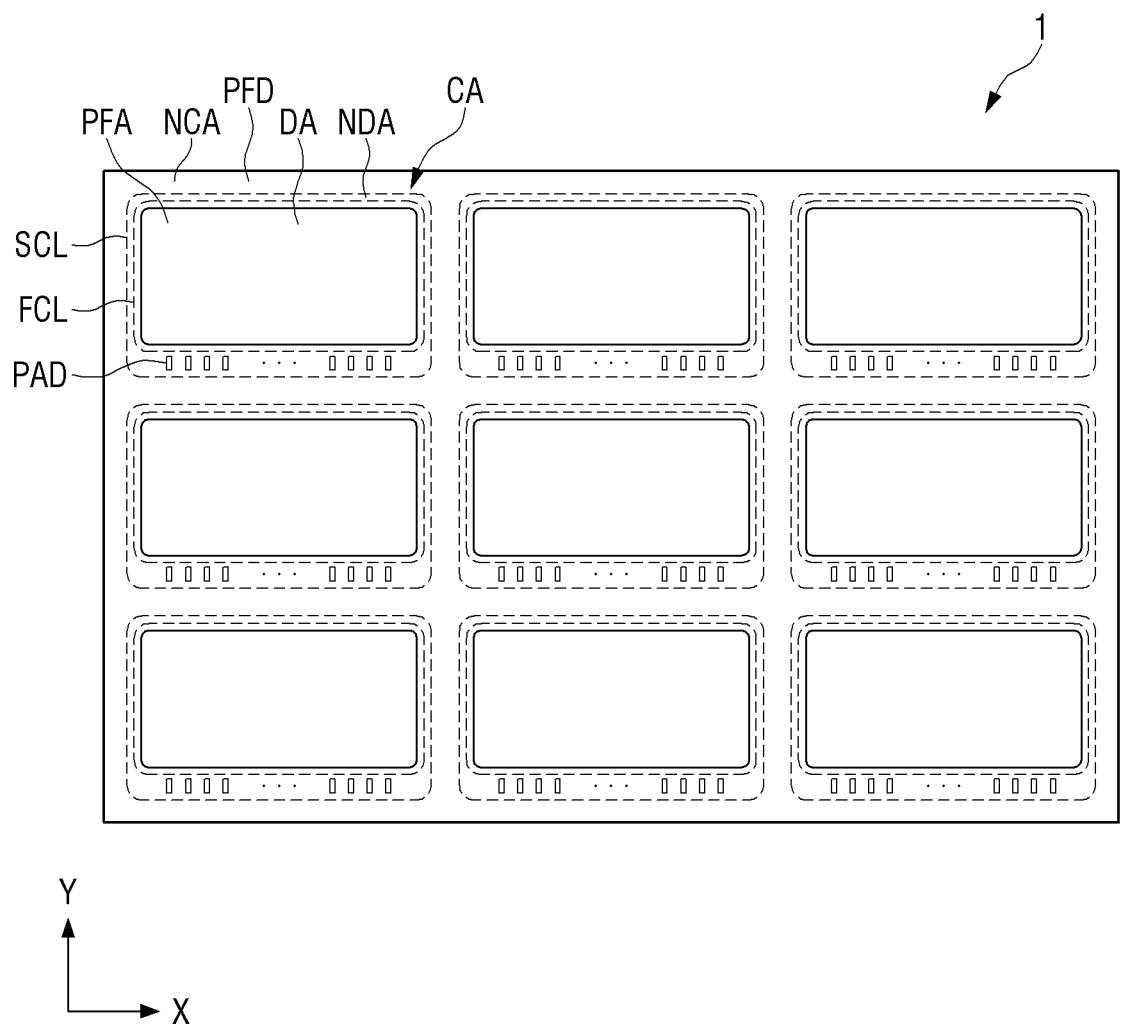
FIG. 2 is a plan view of a peeling target substrate according to one embodiment.
Figure 3:
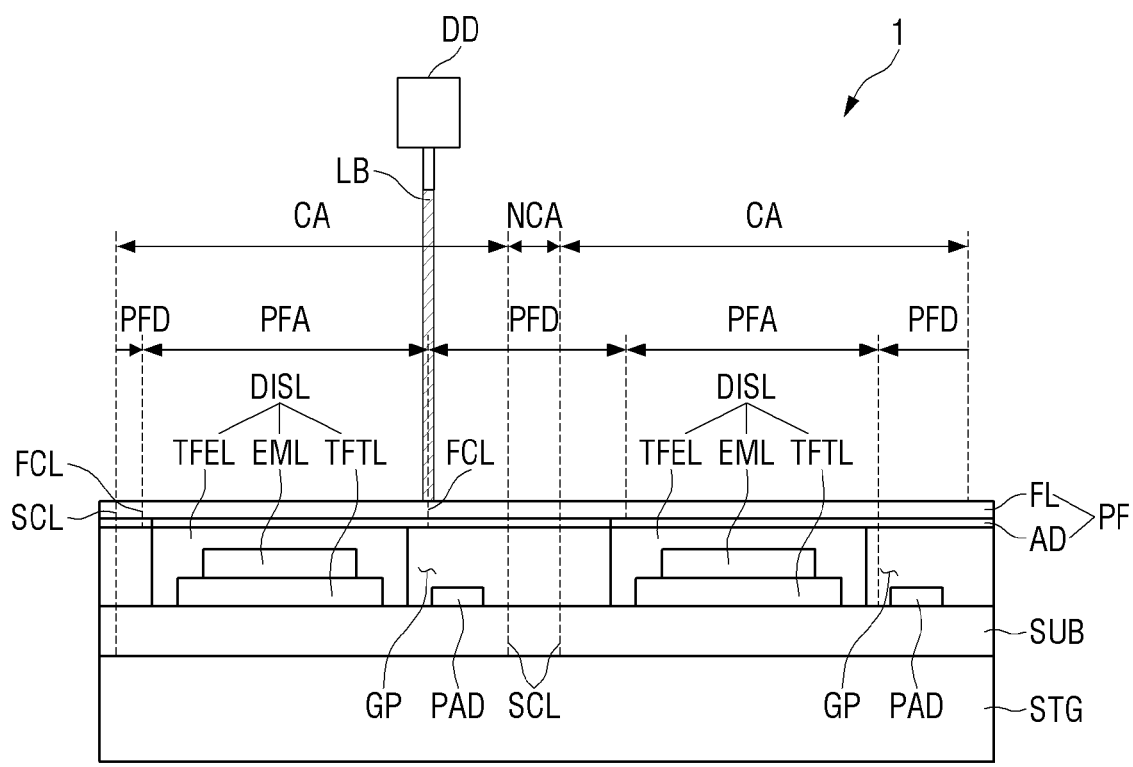
FIG. 3 is a partial cross-sectional view of a peeling target substrate according to one embodiment.

FIG. 1 is a plan view of a display panel according to one embodiment. FIG. 2 is a plan view of a peeling target substrate according to one embodiment. FIG. 3 is a partial cross-sectional view of a peeling target substrate according to one embodiment.

Referring to FIGS. 1 to 3, a display panel 10 may be included in a display device that displays a moving image or a still image. For example, the display panel 10 may be used for a display screen and may be included in various display devices such as televisions, laptop computers, monitors, billboards, and Internet of Things (IOT) devices, as well as portable electronic devices such as mobile phones, smart phones, tablet personal computers (tablet PCs), smart watches, watch phones, mobile communication terminals, electronic notebooks, electronic books, portable multimedia players (PMPs), navigation systems, and ultra-mobile PCs (UMPCs).

According to one embodiment, the display panel 10 may be included in any one of an organic light emitting display device, a liquid crystal display device, a plasma display device, a field emission display device, an electrophoretic display device, an electrowetting display device, a quantum dot light emitting display device, a micro LED display device, and the like.

The display panel 10 may have a rectangular shape having a first side in a first direction X and a second side in a second direction Y. FIG. 1 illustrates that the length of the first side in the first direction X is longer than the length of the second side in the second direction Y, but the present disclosure is not limited thereto, and the length of the first side may be equal to or shorter than the length of the second side. The edge where the first side in the first direction X and the second side in the second direction Y meet may be rounded to have a predetermined curvature, but the present disclosure is not limited thereto, and the edge may be formed at a right angle.

The display panel 10 may include a display area DA and a non-display area NDA that is a peripheral area of the display area DA. The display area DA may be disposed in the center of the display panel 10 and may occupy most of the area of the display panel 10. Although not illustrated, a plurality of scan lines (not shown), a plurality of data lines (not shown), and a plurality of pixels (not shown) may be disposed in the display area DA. Each pixel (not shown) may be connected to a scan line (not shown) and a data line (not shown), and may receive a data voltage of the data line (not shown) by a scan signal applied to the scan line (not shown). Each pixel (not shown) may include a light emitting element that emits light according to the data voltage.

The non-display area NDA may be disposed to surround the display area DA. An area of the non-display area NDA positioned on a first side of the display area DA in the second direction Y may be larger than an area of the non-display area NDA positioned on a second side of the display area DA in the second direction Y and both sides of the display area DA in the first direction X, but the present disclosure is not limited thereto.

A plurality of pads PAD may be disposed in the non-display area NDA positioned on the first side of the display area DA in the second direction Y. The plurality of pads PAD may be arranged along the first direction X. A flexible film (COF film) on which a driving circuit or the like is mounted or the like may be coupled to the plurality of pads PAD to transmit a driving signal to the pixels.

Referring to FIG. 2, the display panel 10 may be formed by cutting a peeling target substrate 1 on which a plurality of scan lines (not shown), a plurality of data lines (not shown), a plurality of pixels (not shown), and the like are formed in cell units along a plurality of substrate cutting lines SCL. The peeling target substrate 1 may include a plurality of cell areas CA respectively positioned inside the substrate cutting lines SCL and an outer cell area NCA surrounding the cell areas CA.

Each cell area CA of the peeling target substrate 1 may be formed as the display panel 10 through a later process. That is, a display area DA and a non-display area NDA may be formed for each cell area CA. FIG. 2 illustrates the peeling target substrate 1 including a total of nine cell areas CA arranged in three rows in the first direction X and three columns in the second direction Y, but the number of cell areas CA included in the peeling target substrate 1 is not limited thereto.

Referring to FIG. 3, the peeling target substrate 1 may include a parent substrate DPM and a protective film PF attached to the parent substrate DPM. The parent substrate DPM may form the above-described display panel 10 through a cutting process and may include a base substrate SUB, a plurality of display layers DISL disposed on the base substrate SUB, and the plurality of pads PAD disposed on the base substrate SUB. A detailed description of each component constituting the parent substrate DPM will be given later.

The protective film PF may serve to protect one surface of the parent substrate DPM to which the protective film PF is attached during a manufacturing process. The protective film PF may include a film portion FL and an adhesive portion AD disposed on the film portion FL. The film portion FL serves to substantially protect the top surface of the parent substrate DPM, and the adhesive portion AD may attach the film portion FL and the parent substrate DPM to each other.

The film portion FL may include a transparent film. For example, the film portion FL may include at least one material selected from the group consisting of polyethylene terephthalate (PET), polyethylene naphthalate (PEN), polycarbonate (PC), polymethyl methacrylate (PMMA), polystyrene (PS), polyvinylchloride (PVC), polyethersulfone (PES), polyethylene (PE), polypropylene (PP), and polyimide (PI), but is not limited thereto.

The peeling target substrate 1 may include the base substrate SUB including the display area DA and the non-display area NDA, the display layer DISL disposed on the display area DA of the base substrate SUB, and the plurality of pads PAD disposed in the non-display area NDA of the base substrate SUB.

Each display layer DISL may include a thin film transistor layer TFTL, a light emitting layer EML disposed on the thin film transistor layer TFTL, and an encapsulation layer TFEL disposed to cover the thin film transistor layer TFTL and the light emitting layer EML. A gap GP may be formed in a display layer DISL adjacent to another display layer DISL. A pad PAD may be disposed to overlap a gap GP.

The protective film PF may be disposed to entirely overlap the base substrate SUB to protect the parent substrate DPM, but the present disclosure is not limited thereto, and the protective film PF may partially overlap the base substrate SUB. The protective film PF may be directly in contact with the encapsulation layer TFEL disposed in a display area DA of the peeling target substrate 1, but may be disposed to be spaced apart from the pads PAD disposed in a non-display area NDA. At least one surface of the protective film PF may include a flat surface.

Referring back to FIG. 2, the protective film PF may include a plurality of active areas PFA respectively disposed inside a plurality of film cutting lines FCL and a dummy area PFD disposed outside the film cutting lines FCL. The film cutting lines FCL may be irradiated with a laser beam LB emitted from an apparatus DD for manufacturing a display device to be described later.

Referring back to FIG. 3, when irradiation is performed with the laser beam LB from the apparatus DD for manufacturing a display device according to one embodiment along the film cutting lines FCL on the protective film PF, the protective film PF may be partially removed and cut. The cutting process of the protective film PF may be performed in a state in which the peeling target substrate 1 is disposed on a stage STG. After the protective film PF is partially removed and cut, the dummy area PFD of the protective film PF may be peeled off. After the dummy area PFD is peeled off and after undergoing a manufacturing process such as an image quality inspection, a display panel 10 may be formed by cutting along a substrate cutting line SCL.

That is, the apparatus DD for manufacturing a display device to be described later may be a laser device that performs irradiation with a laser beam LB to peel off the dummy area PFD of the protective film PF from the peeling target substrate 1.

Figure 4:
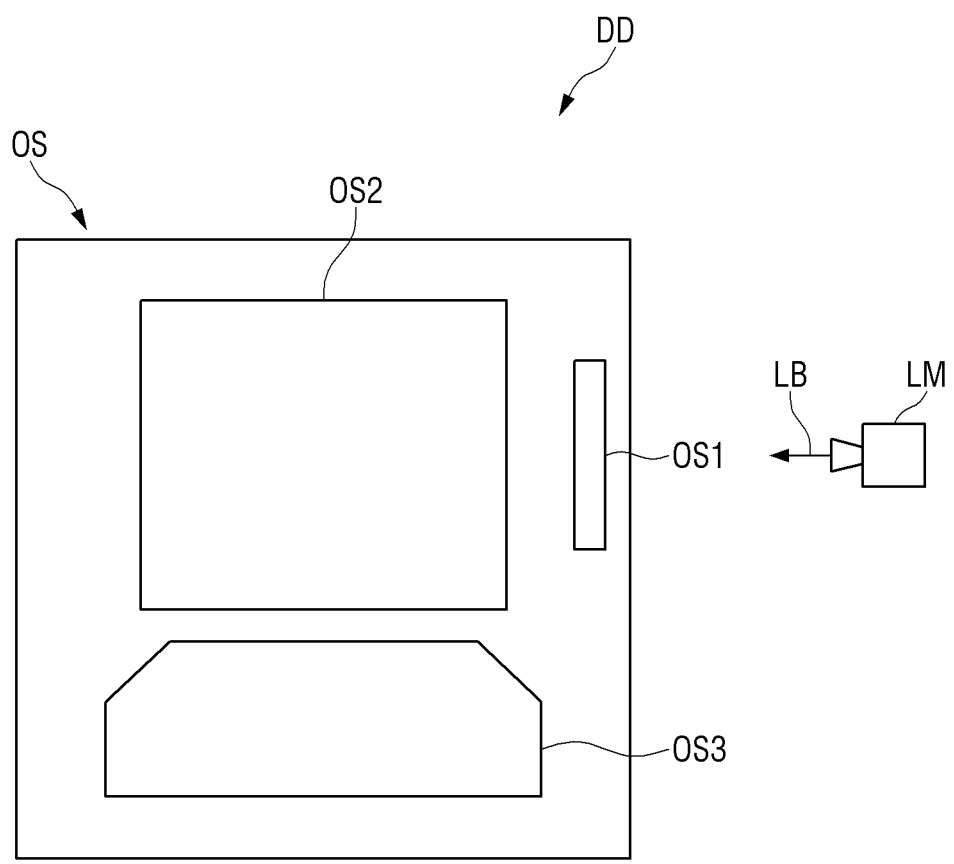
FIG. 4 is a schematic diagram of an apparatus for manufacturing a display device according to one embodiment.
Figure 5:
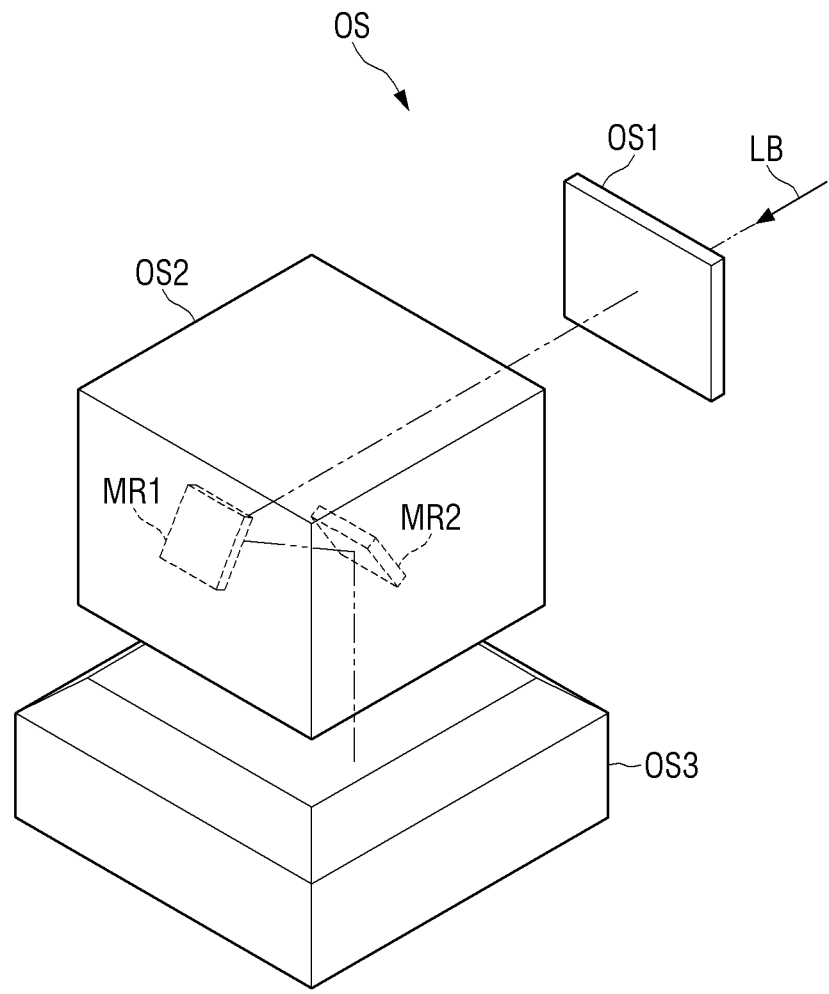
FIG. 5 is a perspective view of an optical system included in an apparatus for manufacturing a display device according to one embodiment.

FIG. 4 is a schematic diagram of an apparatus for manufacturing a display device according to one embodiment. FIG. 5 is a perspective view of an optical system included in an apparatus for manufacturing a display device according to one embodiment.

Referring to FIGS. 4 and 5, the apparatus DD for manufacturing a display device according to one embodiment may include a laser module LM that outputs the laser beam LB and an optical system OS that is disposed on one side of the laser module LM and that controls an optical path and energy profile of the laser beam LB. That is, the apparatus DD for manufacturing a display device according to one embodiment is a device that irradiates the laser beam LB, and the laser beam LB emitted from the laser module LM may be emitted to the outside via the optical system OS.

The laser module LM may output the laser beam LB. The laser beam LB may have straightness. The laser beam LB may form a beam spot on the irradiation surface. The energy profile of the laser beam LB outputted from the laser module LM may have a Gaussian distribution with high energy at the center.

The laser module LM may be an excimer laser, a YAG laser, a glass laser, a YVO4 laser, an argon (Ar) laser, a ruby laser, or the like but is not limited thereto.

The laser beam LB outputted from the laser module LM may enter the optical system OS. The optical system OS may control the optical path and the energy profile of the laser beam LB provided from the laser module LM to emit the beam toward the irradiation target.

The optical system OS may include a first optical system OS1 that controls the energy profile of the laser beam LB, a second optical system OS2 that controls the optical path of the laser beam LB, and a third optical system OS3 that controls a shape of a focal plane of the laser beam LB. FIGS. 4 and 5 illustrate that the laser beam LB outputted from the laser module LM is disposed to pass through the first to third optical systems OS1, OS2, OS3 in order, but the disposition order of the first to third optical systems OS1, OS2, and OS3 is not limited thereto.

The laser beam LB outputted from the laser module LM may form an energy profile of a Gaussian distribution having high energy at the center. The first optical system OS1 may control the energy profile of the laser beam LB. The laser beam LB passing through the first optical system OS1 may have various types of energy profiles. For example, the laser beam LB that has passed through the first optical system OS1 may have an energy profile in the shape of a flat top including a section in which energy is constant, or may have an energy profile of an M-shape in which energy increases and then decreases while moving from the edge toward the center. A detailed description of the energy profiles of the laser beam LB will be described later.

The first optical system OS1 is a beam shaper and may include at least one optical element. For example, the first optical system OS1 may include at least one of a convex lens, a concave lens, a convex mirror, and a concave mirror, or a lens or a mirror formed of a combination thereof. For example, the first optical system OS1 may include a composite lens in which a convex lens and a concave lens are combined in one lens.

In one embodiment, the laser beam LB that has passed through the first optical system OS1 may enter the second optical system OS2. The second optical system OS2 may control the optical path of the laser beam LB. In one embodiment, the second optical system OS2 may include a first mirror MR1 and a second mirror MR2. For example, the first mirror MR1 and the second mirror MR2 may change the optical path of the laser beam LB in the first direction X and the second direction Y.

The second optical system OS2 may be a laser scanner that scans the laser beam LB in the first direction X and the second direction Y. For example, the first mirror MR1 may shake the laser beam LB in the first direction X, and the second mirror MR2 may shake the laser beam LB in the second direction Y.

The laser beam LB that has passed through the second optical system OS2 may enter the third optical system OS3. The third optical system OS3 may control a shape of a focal plane that is a set of focal points of the laser beam LB. The third optical system OS3 may include an F-theta lens. For example, the focal plane of the laser beam LB that has passed through the third optical system OS3 may be flat, but is not limited thereto and may be a spherical surface having a curvature.

Hereinafter, irradiation of the laser beam LB using the apparatus DD for manufacturing a display device according to one embodiment will be described.

Figure 6:
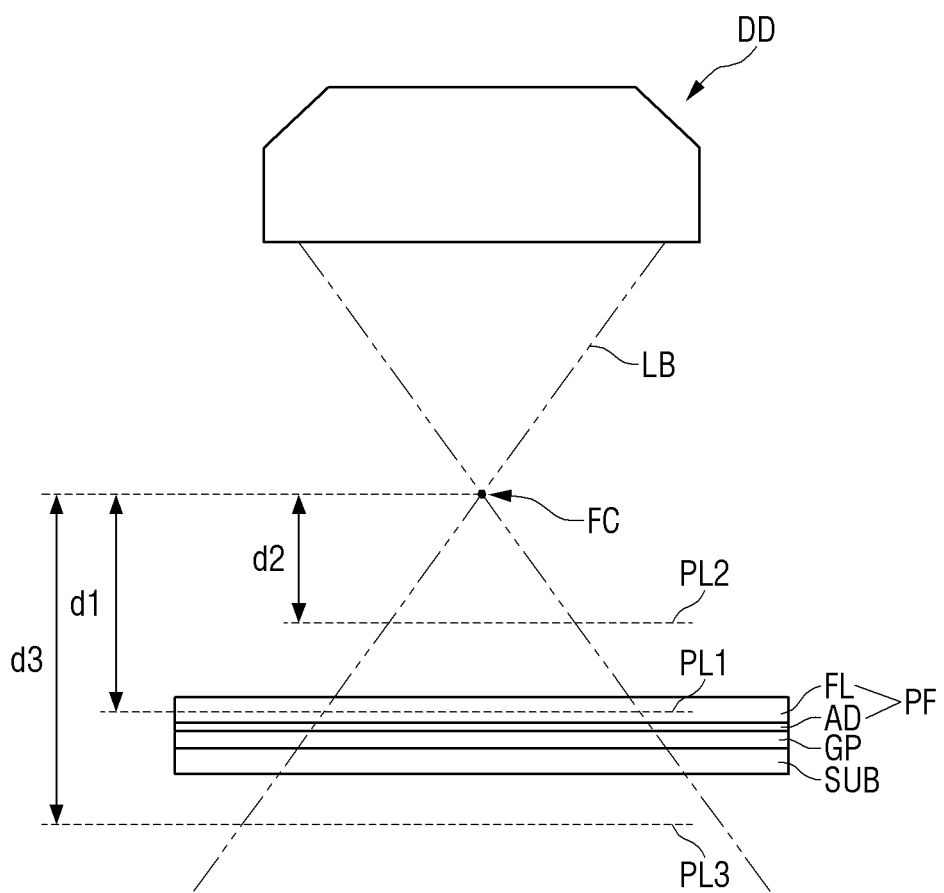
FIG. 6 is a schematic diagram illustrating a peeling target substrate to which a laser beam is irradiated.
Figure 7:
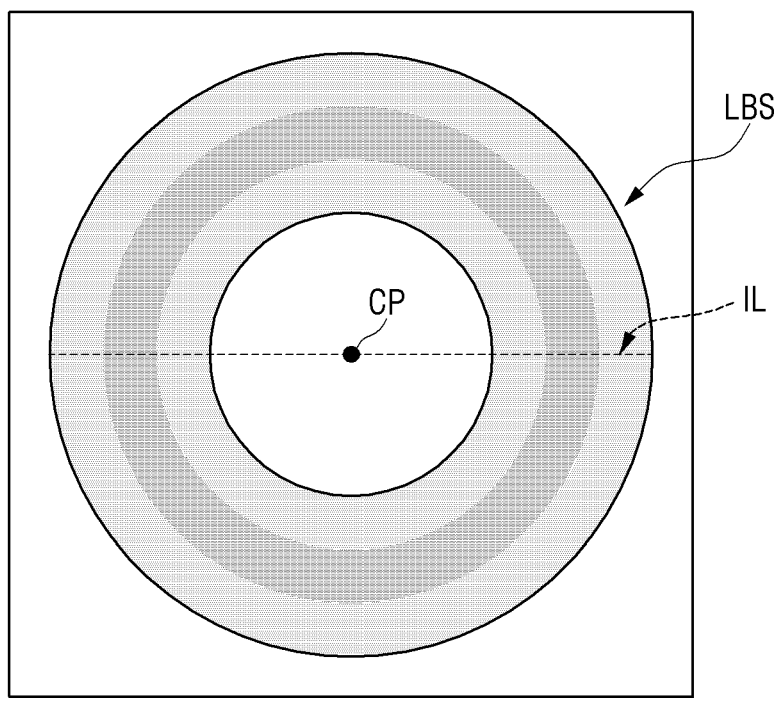
FIG. 7 is a diagram illustrating a planar shape of a laser beam spot on the first irradiation surface of FIG. 6.
Figure 8:
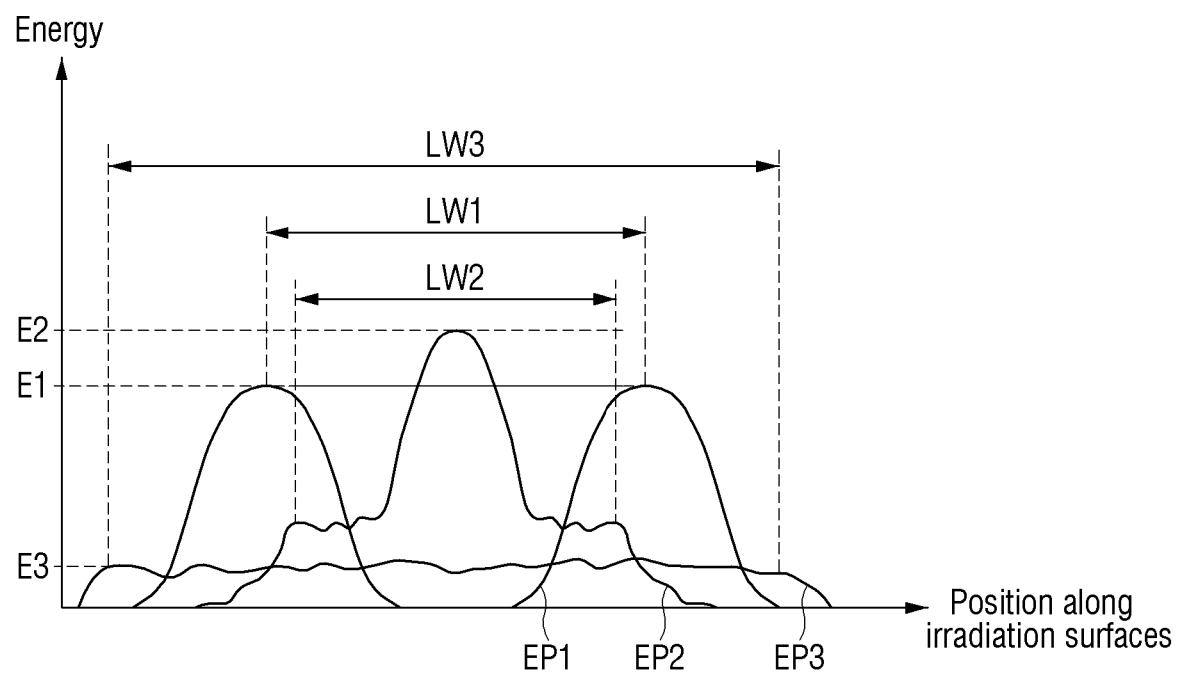
FIG. 8 is a graph illustrating energy profiles of the laser beam on the first to third irradiation surfaces of FIG. 6.

FIG. 6 is a schematic diagram illustrating a peeling target substrate to which a laser beam is irradiated. FIG. 7 is a diagram illustrating a planar shape of a laser beam spot on the first irradiation surface of FIG. 6. FIG. 8 is a graph illustrating energy profiles of the laser beam on the first to third irradiation surfaces of FIG. 6.

Referring to FIGS. 6 to 8, irradiation may be performed with the laser beam LB from the apparatus DD for manufacturing a display device according to one embodiment onto the base substrate SUB to which the protective film PF is attached. Specifically, irradiation may be performed with the laser beam LB onto the protective film PF attached on the base substrate SUB.

Irradiation may be performed with the laser beam LB on the protective film PF to partially remove and cut the protective film PF. Specifically, the laser beam LB may partially remove and cut the film portion FL and the adhesive portion AD in the area on which irradiation is performed with the laser beam LB.

The protective film PF on which irradiation is performed with the laser beam LB may be positioned farther than a focus FC of the laser beam LB from the apparatus DD for manufacturing a display device according to one embodiment. That is, the focus FC of the laser beam LB may be positioned between the apparatus DD for manufacturing a display device according to one embodiment and the protective film PF.

The protective film PF on which irradiation is performed with the laser beam LB may be positioned at a position spaced apart from the focal point FC by a first distance d1 in the traveling direction of the laser beam LB. An imaginary surface that is perpendicular to the traveling direction of the laser beam LB and that is positioned at a position spaced apart from the focal point FC of the laser beam LB by the first distance d1 may be defined as a first irradiation surface PL1. The first irradiation surface PL1 may be flat. When the distance between the optical system OS and the protective film PF is 75 mm, the first distance d1 may be from about 4.7 mm to about 5.3 mm, but is not limited thereto.

Referring to FIG. 7, the laser beam LB may have a laser beam spot LBS of a circular shape at the position of the first irradiation surface PL1. In FIG. 7, areas of relatively low energy are illustrated to be bright and areas of relatively high energy are illustrated to be dark. The laser beam spot LBS may have zero energy at its center. Accordingly, the laser beam spot LBS may have a donut shape on the first irradiation surface PL1. An energy profile of the laser beam spot LBS formed along an imaginary straight line IL passing through a midpoint CP of the laser beam spot LBS and parallel to the first irradiation surface PL1 may be formed as a first energy profile EP1 of FIG. 8.

Referring to FIG. 8, the laser beam spot LBS on the first irradiation surface PL1 may exhibit a first energy profile EP1 in which energy increases when moving inward along the imaginary line IL from an outer perimeter of the laser beam spot LBS toward a center of the laser beam spot LBS, forms a peak at a maximum energy E1, and decreases when moving again toward the center.

The width of the laser beam LB may be defined as the interval between the outermost peaks in an energy profile crossing the midpoint CP of the laser beam spot LBS on the corresponding irradiation surface. The width of the laser beam LB may form a first beam width LW1 on the first irradiation surface PL1.

FIG. 6 illustrates a case where the first irradiation surface PL1 is disposed inside the film portion FL, but the present disclosure is not limited thereto, and the first irradiation surface PL1 may be positioned at the boundary between the film portion FL and the adhesive portion AD or inside the adhesive portion AD. That is, the first irradiation surface PL1 may be positioned at an arbitrary position inside the protective film PF.

Referring back to FIG. 6, an imaginary surface that is perpendicular to the traveling direction of the laser beam LB and that is positioned at a position spaced apart from the focal point FC of the laser beam LB by a second distance d2 that is less than the first distance d1 may be defined as a second irradiation surface PL2. On the second irradiation surface PL2, an energy profile of the laser beam LB may be formed as a second energy profile EP2 of FIG. 8.

Referring to FIG. 8, the energy of the laser beam LB on the second irradiation surface PL2 may exhibit a second energy profile EP2 in which energy increases, stays approximately constant, and then increases again when moving inward from a perimeter of the laser beam LB toward a center of the laser beam LB, forming a peak with a maximum energy E2 at the center. The maximum energy E2 may be greater than the maximum energy E1. On the second irradiation surface PL2, the width of the laser beam LB may form a second beam width LW2. The second beam width LW2 may be smaller than the first beam width LW1, but is not limited thereto.

Referring back to FIG. 6, an imaginary surface that is perpendicular to the traveling direction of the laser beam LB and that is positioned at a position spaced apart from the focal point FC of the laser beam LB by a third distance d3 that is greater than the first distance d1 may be defined as a third irradiation surface PL3. The third irradiation surface PL3 may be positioned lower than the base substrate SUB.

Since the energy of the laser beam LB is mostly absorbed by the protective film PF forming the first irradiation surface PL1, the energy of the laser beam LB at the third irradiation surface PL3 may be very low. On the third irradiation surface PL3, an energy profile of the laser beam LB may be formed as a third energy profile EP3 of FIG. 8.

Referring to FIG. 8, the energy of the laser beam LB on the third irradiation surface PL3 may exhibit a third energy profile EP3 in which energy stays substantially constant around a maximum energy E3 when moving inward from a perimeter of the laser beam LB toward a center of the laser beam LB. As described above, since the energy of the laser beam LB is mostly absorbed by the protective film PF, the maximum energy E3 may be less than the maximum energy E1 and the maximum energy E2.

In the third irradiation surface PL3, the width of the laser beam LB may form a third beam width LW3. The third beam width LW3 may be greater than the first beam width LW1, but is not limited thereto.

Figure 9:
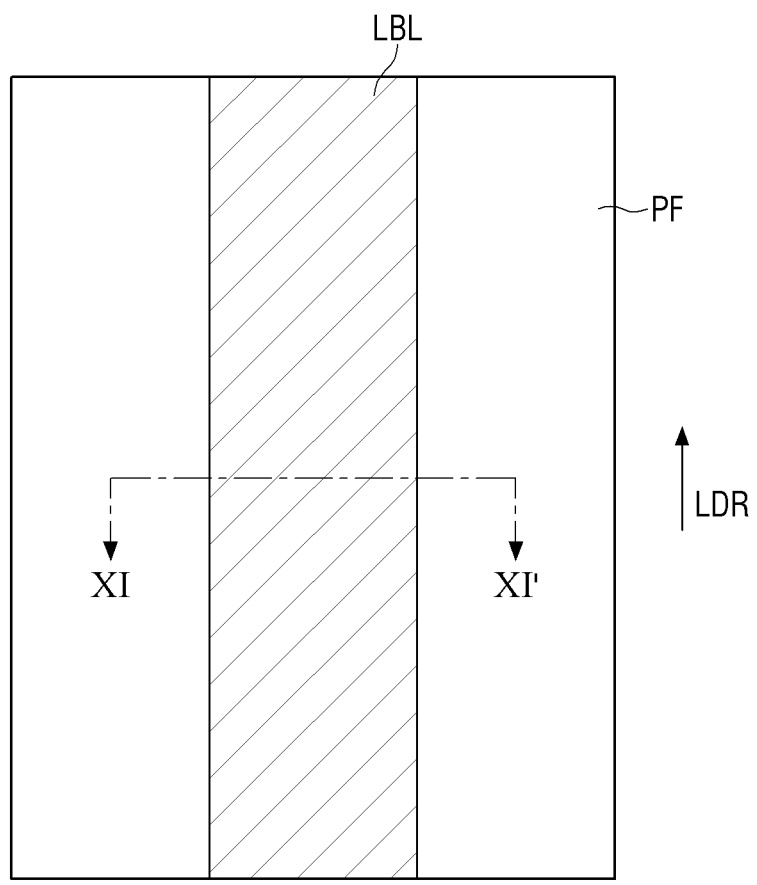
FIG. 9 is a plan view illustrating a portion of a peeling target substrate on which a laser beam is moved to perform irradiation.
Figure 10:
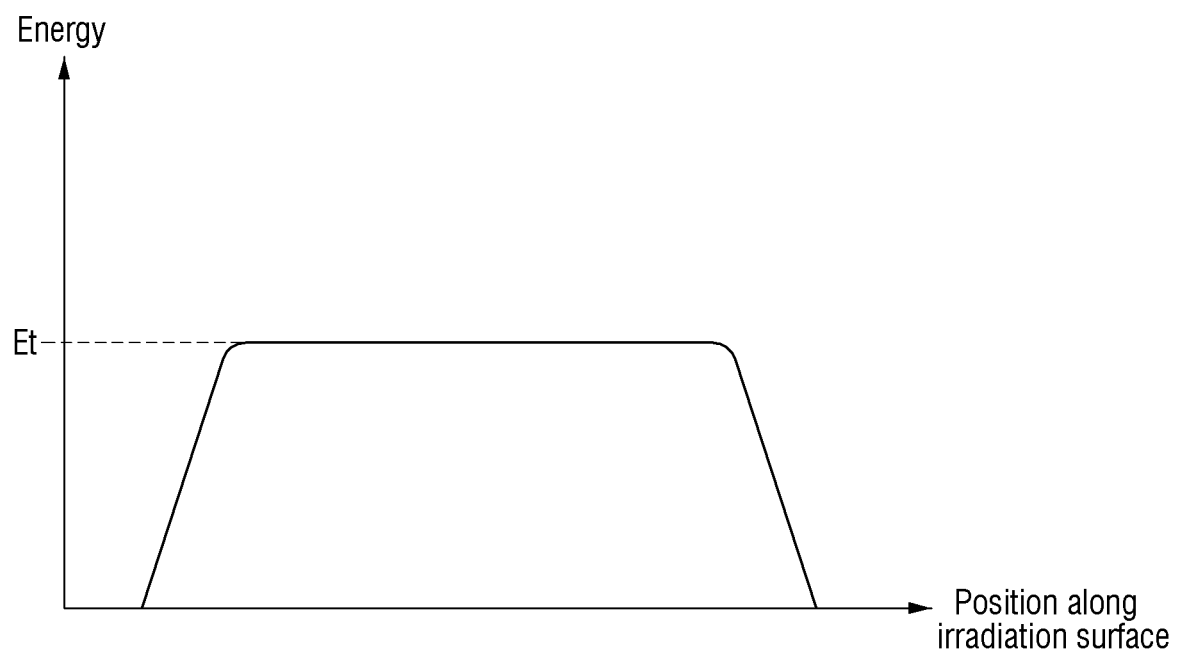
FIG. 10 is a graph illustrating an accumulative energy profile by a laser beam on the first irradiation surface of FIG. 6.
Figure 11:
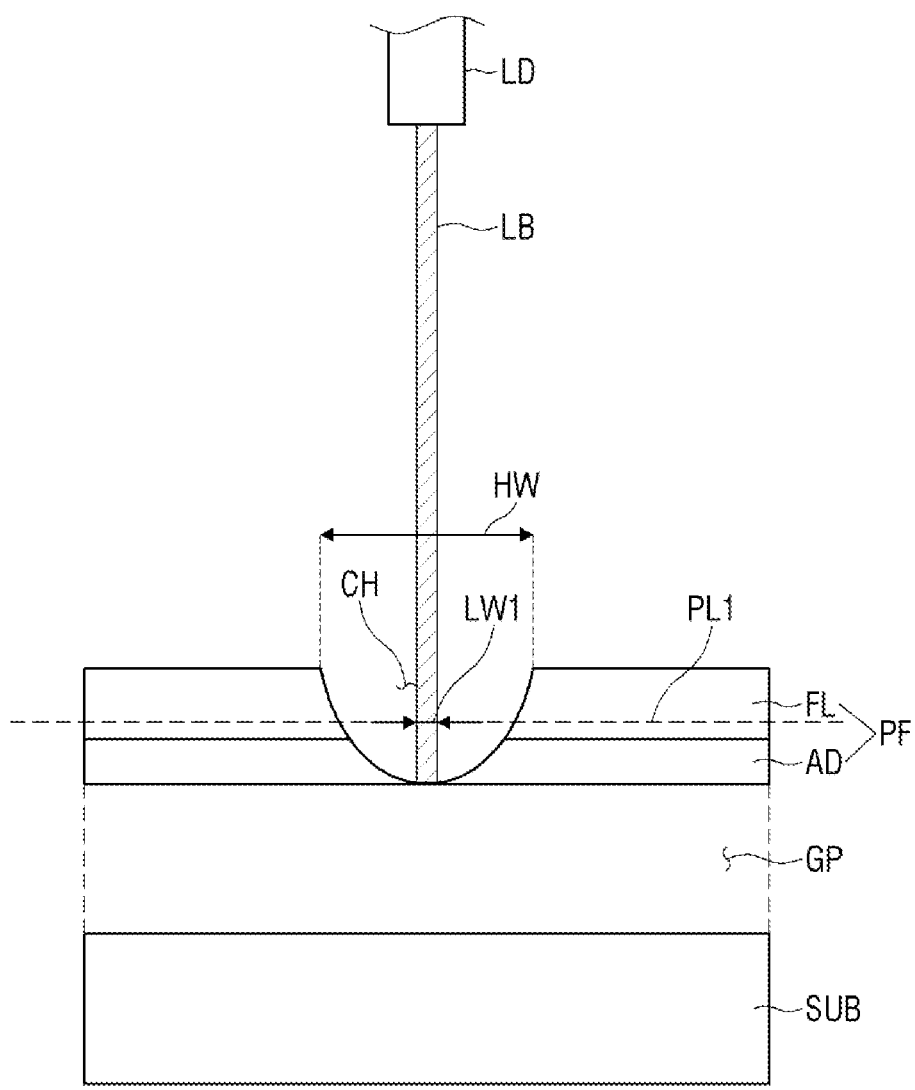
FIG. 11 is a cross-sectional view taken along line XI-XI' of FIG. 9.

FIG. 9 is a plan view illustrating a portion of a peeling target substrate on which a laser beam is moved to perform irradiation. FIG. 10 is a graph illustrating an accumulative energy profile exhibited by a laser beam on the first irradiation surface of FIG. 6. FIG. 11 is a cross-sectional view taken along line XI-XI' of FIG. 9.

Referring to FIGS. 9 to 11, when the laser beam LB moves along a predetermined laser movement direction LDR on the protective film PF, the laser beam LB may form a laser beam line LBL. The laser beam line LBL may appear after the protective film PF is partially removed by the laser beam LB. Specifically, as illustrated in FIG. 11, the film portion FL and the adhesive portion AD disposed in an area overlapping the laser beam LB may be removed.

The laser beam line LBL of FIG. 9 may appear when the laser beam LB moves and laser beam spots LBS formed on the first irradiation surface PL1 overlap each other. When the laser beam LB moves from a first position to a second position, a laser beam spot LBS formed on the first position and a laser beam spot LBS formed on the second position may overlap each other by about 80% or more, but the present disclosure is not limited thereto. As the laser LB moves along the laser movement direction LDR and the laser beam spots LBS overlap each other, energy provided to the protective film PF by the laser beam LB may be accumulated.

FIG. 10 illustrates an accumulative energy profile that may appear when the laser beam LB moves and the laser beam spots LBS formed on the first irradiation surface PL1 overlap each other. That is, when the laser beam spots LBS having the energy profile of the first energy profile EP1 of FIG. 8 overlap, the accumulative energy profile of the graph of FIG. 10 may appear.

The accumulative energy profile of FIG. 10 may be an energy profile of a cross section of the laser beam line LBL cut in a direction perpendicular to the laser movement direction LDR. The accumulative energy profile of the laser beam line LBL may represent a profile in which energy increases and then stays substantially constant at energy Et when moving inward along a straight line perpendicular to the laser movement direction LDR from a perimeter of the laser beam line LBL to a middle of the laser beam line LBL.

Specifically, in the laser beam line LBL, the energy profile may include a first section in which energy increases when moving inward along the straight line perpendicular to the laser movement direction LDR from the perimeter of the laser beam line LBL to the middle of the laser beam line LBL, and a second section that is positioned inside the first section and that represents constant energy. The area of the first section may be smaller than the area of the second section.

When the laser beam LB is moved to perform irradiation in a state where the first irradiation surface PL1 is positioned inside the protective film PF, the accumulative energy received by the area irradiated with the laser beam LB in the protective film PF may be substantially constant for each area.

When irradiation is performed with the laser beam LB so that the first irradiation surface PL1 is formed on the protective film PF, the protective film PF may be partially removed to form cutting grooves CH. The cutting grooves CH may be formed by partially removing the film portion FL and the adhesive portion AD of the protective film PF. A cross section of a cutting groove CH may have a downwardly convex parabolic shape, but is not limited thereto. As described above, since the laser beam spots LBS overlap as the laser beam LB moves, the energy of the laser beam LB in the protective film PF may be provided to a wider area than each individual laser beam spot LBS. Accordingly, a groove width HW, which is a width of an upper end of a cutting groove CH, may be larger than the first beam width LW1.

In the area where the cutting grooves CH are formed, the laser beam LB may appropriately adjust the irradiation time so that the film portion FL and the adhesive portion AD is removed by the laser beam LB and penetrated in a thickness direction. Accordingly, in a later peeling process of the dummy area PFD of the protective film PF, peeling of the protective film PF may be easily performed although the adhesive portion AD overlapping the cutting grooves CH is not separately removed.

Irradiation may be performed with the laser beam LB on the protective film PF until the adhesive portion AD is partially removed and penetrated. However, although the laser beam LB directly irradiates the base substrate SUB after the adhesive portion AD is penetrated, only a small amount of energy may be applied to the base substrate SUB since the energy profile of the laser beam LB is formed as the first energy profile EP1 of FIG. 8 via beam shaping through the first optical system OS1. Accordingly, the base substrate SUB disposed under the protective film PF may not be damaged.

The apparatus DD for manufacturing a display device according to one embodiment may include the first optical system OS1 to control the energy profile of the laser beam LB. By doing so, when irradiation is performed with the laser beam LB, excessive energy may be prevented from being applied to the irradiation target. In addition, when the laser beam LB is moved to perform irradiation, uniform energy may be provided to the irradiation target for each area.

In addition, the apparatus DD for manufacturing a display device according to one embodiment may perform irradiation using the laser beam LB so that the first irradiation surface PL1 is positioned inside the protective film PF. This may provide for partial peeling of the protective film PF, including the film portion FL and the adhesive portion AD, attached to the base substrate SUB, so that the film portion FL and the adhesive portion AD may be penetrated in a thickness direction. In this case, the energy profile of the laser beam LB may be controlled to prevent damage to the base substrate SUB disposed under the protective film PF.

Hereinafter, a method for manufacturing a display device using the above-described apparatus DD for manufacturing a display device according to one embodiment will be described.

Figure 12:
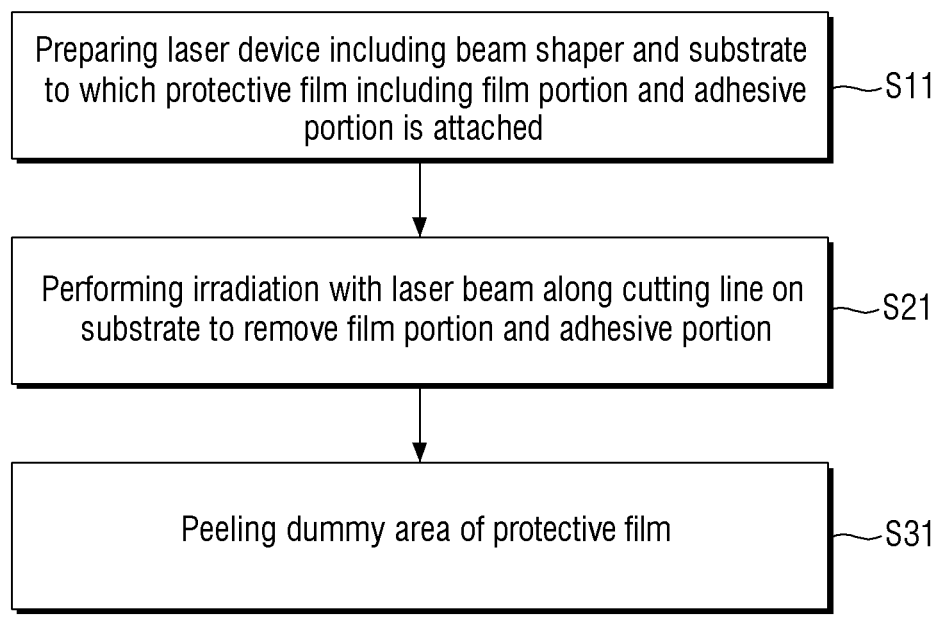
FIG. 12 is a flowchart illustrating a method for manufacturing a display device according to one embodiment.
Figure 13:
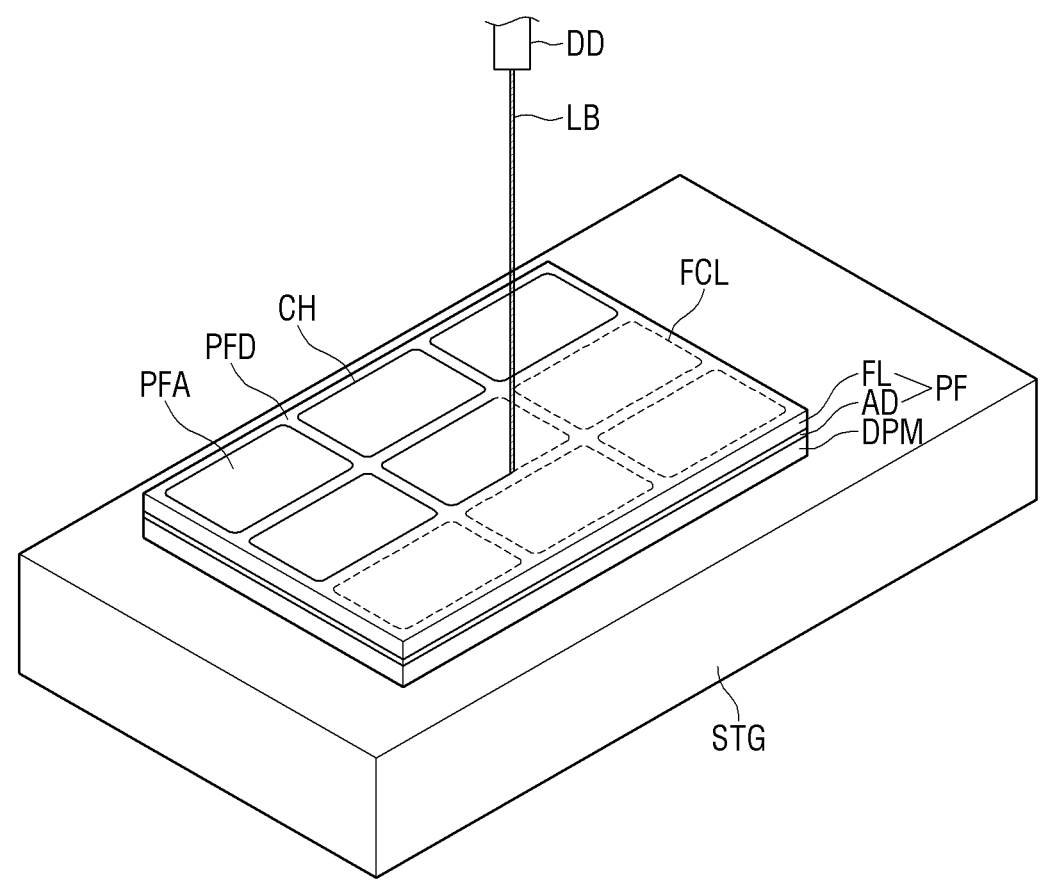
FIG. 13 is a perspective view illustrating a process of performing irradiation with a laser beam on a peeling target substrate.
Figure 14:
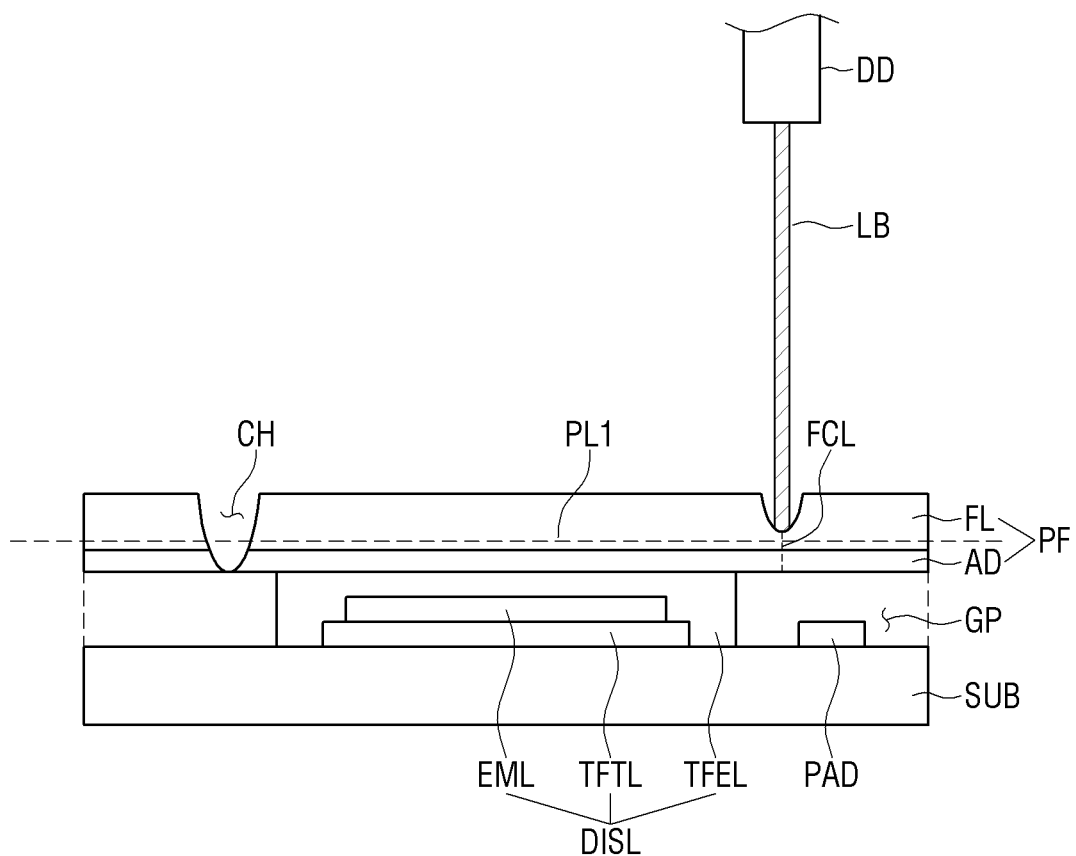
FIG. 14 is a schematic cross-sectional view illustrating a process of performing irradiation with a laser beam on a peeling target substrate.
Figure 15:
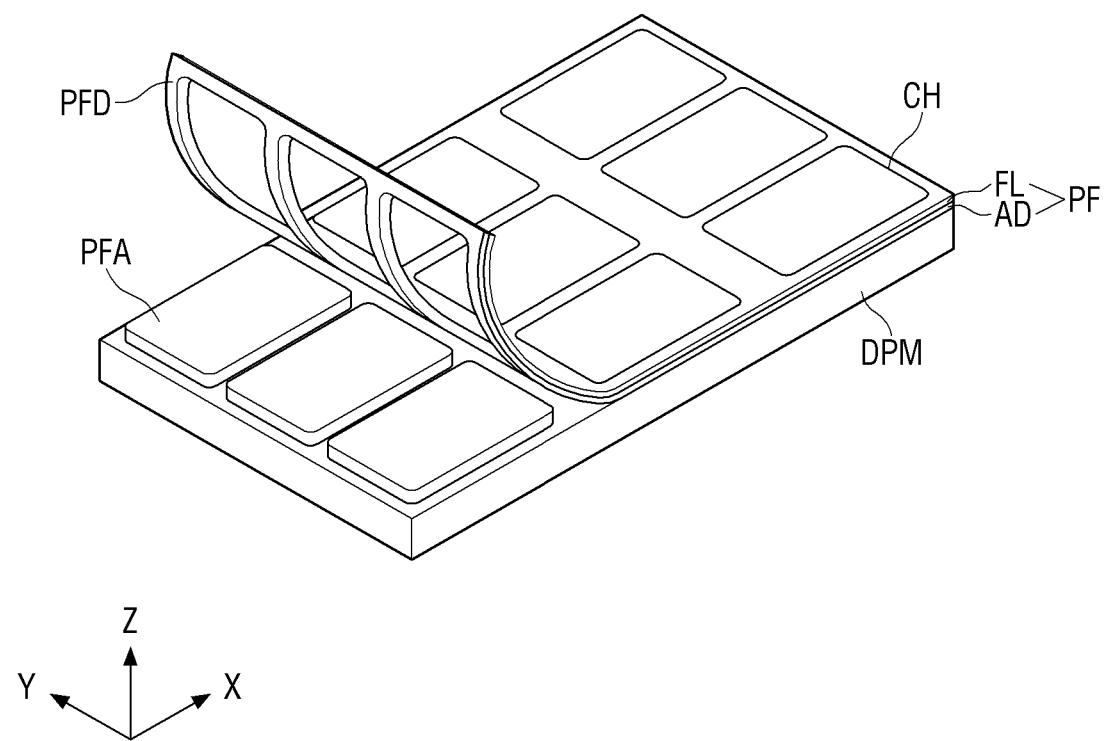
FIG. 15 is a perspective view illustrating a process of peeling off a dummy area of a protective film.

FIG. 12 is a flowchart illustrating a method for manufacturing a display device according to one embodiment. FIG. 13 is a perspective view illustrating a process of performing irradiation with a laser beam on a peeling target substrate. FIG. 14 is a schematic cross-sectional view illustrating a process of performing irradiation with a laser beam on a peeling target substrate. FIG. 15 is a perspective view illustrating a process of peeling off a dummy area of a protective film.

Referring to FIG. 12, a method for manufacturing a display device according to one embodiment may include preparing a laser device including a beam shaper and a substrate to which a protective film including a film portion and an adhesive portion is attached (step S11), performing irradiation with a laser beam along a cutting line on the substrate to remove the film portion and the adhesive portion (step S21), and peeling a dummy area of the protective film (step S31).

In accordance with step S11, preparing a laser device including a beam shaper and a substrate to which a protective film including a film portion and an adhesive portion is attached, the laser device may be the apparatus DD for manufacturing a display device according to one embodiment described above with reference to FIGS. 4 and 5, and the substrate may be the parent substrate DPM to which the protective film PF described above, with reference to FIGS. 2 and 3, is attached. Accordingly, additional descriptions of the laser device and the substrate in this step will be omitted.

Referring to FIGS. 12 to 14, after step S11, preparing a laser device including a beam shaper and a substrate to which a protective film including a film portion and an adhesive portion is attached, step S21, performing irradiation with a laser beam along a cutting line on the substrate to remove the film portion and the adhesive portion, may be performed.

The apparatus DD for manufacturing a display device according to one embodiment may perform irradiation with the laser beam LB toward the protective film PF. Irradiation may be performed with the laser beam LB along the film cutting lines FCL. The process of partially removing the film portion FL and the adhesive portion AD using the laser beam LB may be a cutting process of the protective film PF. Specifically, when irradiation is performed with the laser beam LB along the film cutting lines FCL, the film portion FL and the adhesive portion AD may be partially removed to form the cutting grooves CH. The cutting grooves CH may overlap the gap GP disposed between the display layers DISL without overlapping the display layer DISL. The cutting grooves CH may have a closed curve shape, the inside of the cutting grooves CH may be the active areas PFA of the protective film PF, and the outside thereof may be the dummy area PFD.

In this step, the protective film PF may be cut by removing the film portion FL and the adhesive portion AD through properly adjusting the time during which irradiation is performed with the laser beam LB using the apparatus DD for manufacturing a display device according to one embodiment.

The apparatus DD for manufacturing a display device according to one embodiment may include the first optical system OS1 as described above with reference to FIGS. 4 and 5, and the first irradiation surface PL1 may be positioned inside the protective film PF. Accordingly, the energy profile of the laser beam LB in the protective film PF may be formed as the first energy profile EP1 of FIG. 8.

In one embodiment, irradiation may be performed with the laser beam LB on the protective film PF until the adhesive portion AD is penetrated in a thickness direction. Irradiation may be performed with the laser beam LB on the protective film PF for a predetermined time even after the adhesive portion AD is penetrated in the thickness direction. As described above, the laser beam LB forms the energy profile of the first energy profile EP1 of FIG. 8 in the protective film PF on which the first irradiation surface PL1 is formed, and in this case also, the base substrate SUB may not be damaged.

Referring to FIGS. 12 and 15, after step S21, performing irradiation with a laser beam along a cutting line on the substrate to remove the film portion and the adhesive portion, step S31, peeling a dummy area of the protective film, may be performed.

When the cutting grooves CH with a closed curved shape are formed through irradiation with the laser beam LB, the protective film PF may be divided into the active areas PFA inside the cutting grooves CH and the dummy area PFD outside the cutting grooves CH. At this time, when the dummy area PFD is peeled off, only the active areas PFA of the protective film PF may remain on the base substrate SUB.

According to a method for manufacturing a display device according to one embodiment, when irradiation is performed with the laser beam LB using the apparatus DD for manufacturing a display device according to one embodiment having the first optical system OS1 that controls the energy profile of the laser beam LB, it is possible to prevent excessive energy from being applied to the irradiation target. In addition, when the laser beam LB is moved to perform irradiation, uniform energy may be provided for each area of a line in which the irradiation is performed for the irradiation target. By doing so, the protective film PF may be stably removed.

According to the method for manufacturing a display device according to one embodiment, irradiation may be performed using the laser beam LB so that the first irradiation surface PL1 is positioned inside the protective film PF. This may provide for partial peeling of the protective film PF, including the film portion FL and the adhesive portion AD, attached to the substrate SUB, so that the film portion FL and the adhesive portion AD may be penetrated in a thickness direction. In this case, the energy of the laser beam LB may be controlled to prevent damage to the base substrate SUB disposed under the protective film PF.

Hereinafter, another embodiment of the apparatus DD for manufacturing a display device will be described, description overlapping that of the apparatus DD for manufacturing a display device according to one embodiment will be omitted and the description will focus on differences.

The apparatus DD for manufacturing a display device according to another embodiment to be described later differs from the apparatus DD for manufacturing a display device according to one embodiment in that the laser beam spot LBS of the laser beam LB forms an energy profile having a different shape. Hereinafter, shapes and energy profiles of laser beam spots of the laser beam LB of the apparatus DD for manufacturing a display device according to another embodiment will be mainly described.

Figure 16:
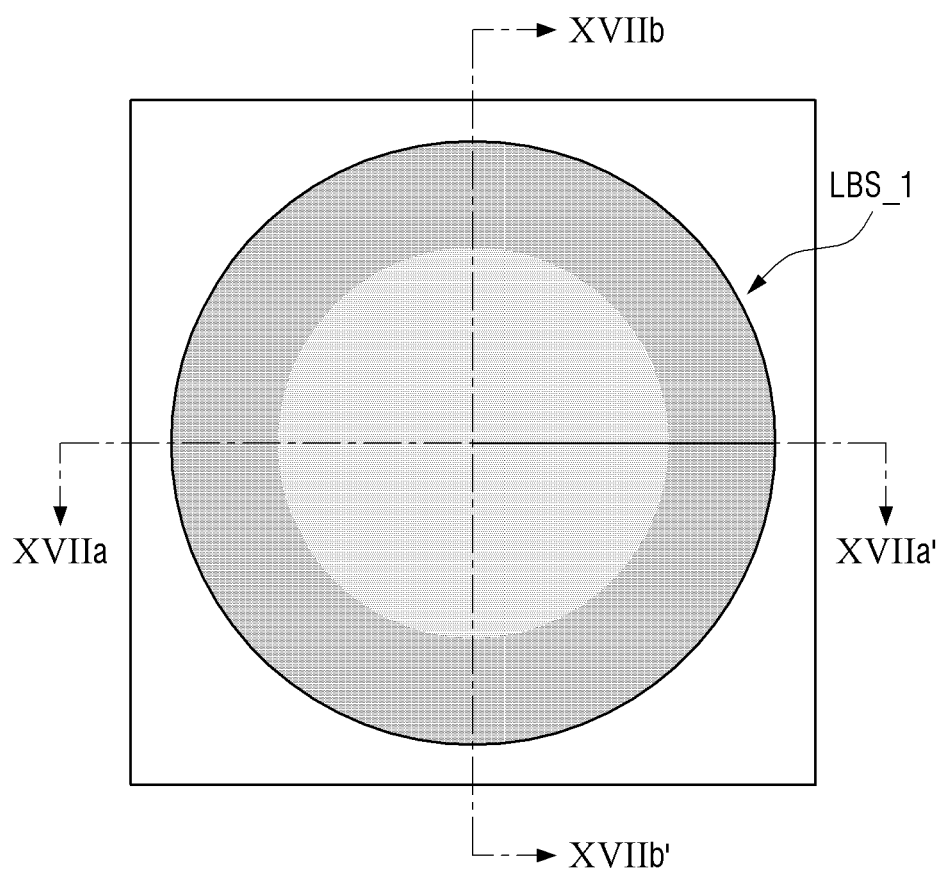
FIG. 16 is a diagram illustrating a planar shape of a laser beam spot according to another embodiment.
Figure 17:
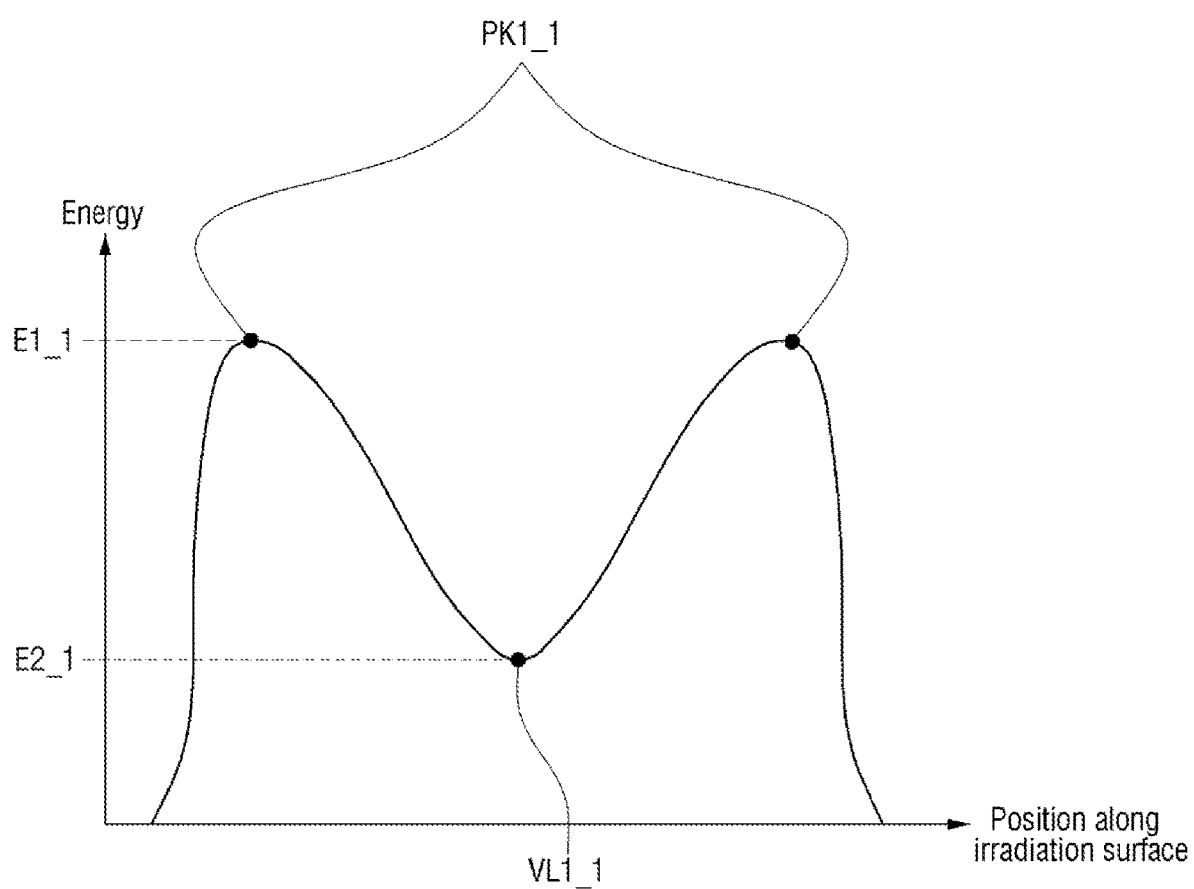
FIG. 17 is a graph illustrating an energy profile of a cross section taken along line XVIIa-XVIIa' or XVIIb-XVIIb' of FIG. 16.

FIG. 16 is a diagram illustrating a planar shape of a laser beam spot according to another embodiment. FIG. 17 is a graph illustrating an energy profile of a cross section taken along line XVIIa-XVIIa' or XVIIb-XVIIb' of FIG. 16.

Referring to FIGS. 16 and 17, the apparatus DD for manufacturing a display device according to the present embodiment may form an energy profile having a shape different from that of the laser beam spot LBS according to one embodiment. A laser beam spot LBS_1 according to the present embodiment is the same as that of the laser beam spot LBS according to one embodiment in that it is circular and the energy increases and decreases when moving from an outer edge of the laser beam spot to its center, but differs from the laser beam spot LBS according to one embodiment in that it has a predetermined energy in its center.

Specifically, the laser beam spot LBS_1 according to the present embodiment may exhibit an energy profile with a first peak PK1_1 at a maximum energy E1_1 as energy increases when moving from an outer edge of the laser beam spot LBS_1 toward the center and with a first relative minimum point VL1_1 at a relative minimum energy E2_1 as energy decreases when moving further to the center.

The apparatus DD for manufacturing a display device according to the present embodiment may include the first optical system OS1 to control the energy profile of the laser beam LB. By doing so, when irradiation is performed with the laser beam LB, excessive energy may be prevented from being applied to the irradiation target. In addition, when the laser beam LB is moved to perform irradiation, uniform energy may be provided to the irradiation target for each area.

The apparatus DD for manufacturing a display device according to the present embodiment may perform irradiation using the laser beam LB so that the first irradiation surface PL1 is positioned inside the protective film PF. This may provide for partial peeling of the protective film PF, including the film portion FL and the adhesive portion AD, attached to the base substrate SUB, so that the film portion FL and the adhesive portion AD may be penetrated in a thickness direction. In this case, the energy of the laser beam LB may be controlled to prevent damage to the base substrate SUB disposed under the protective film PF.

In addition, the apparatus DD for manufacturing a display device according to the present embodiment has a predetermined energy at the center of the laser beam spot LBS_1 that forms a valley in the energy profile so that when the size of the laser beam spot LBS_1 increases, the energy provided at the center of a line in which irradiation is performed with the laser beam LB may be increased when the laser beam LB is moved, and thus uniform energy may be provided for each area of the line in which irradiation is performed with the laser beam LB.

Figure 18:
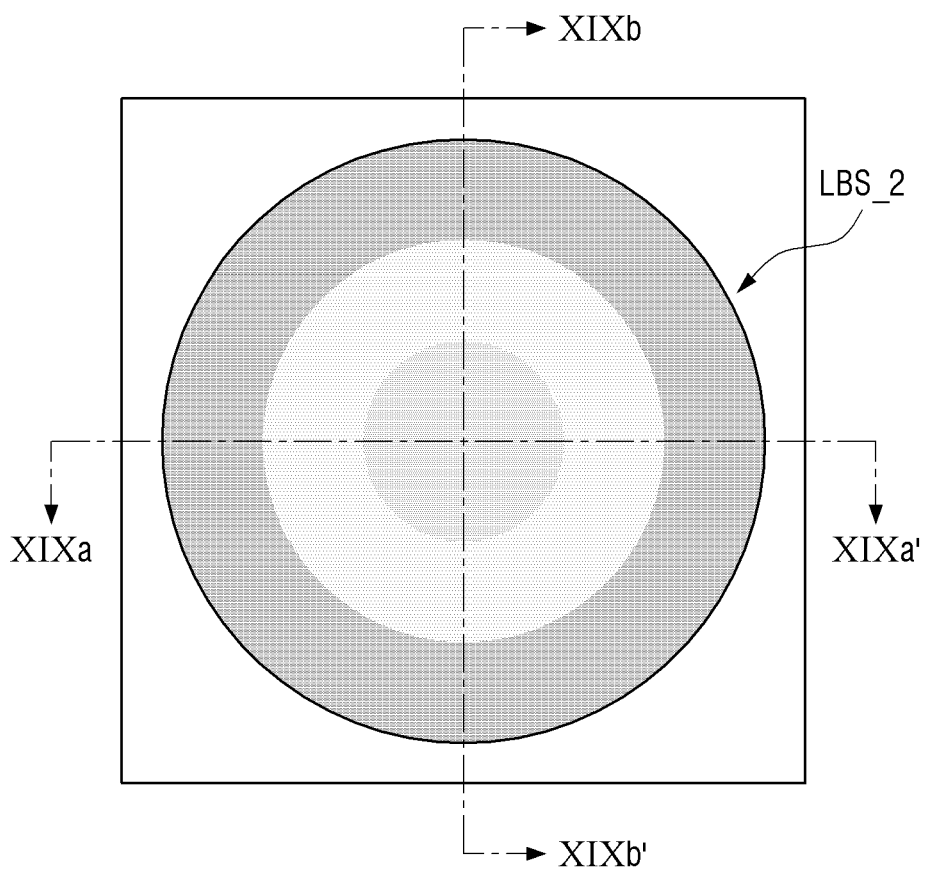
FIG. 18 is a diagram illustrating a planar shape of a laser beam spot according to still another embodiment.
Figure 19:
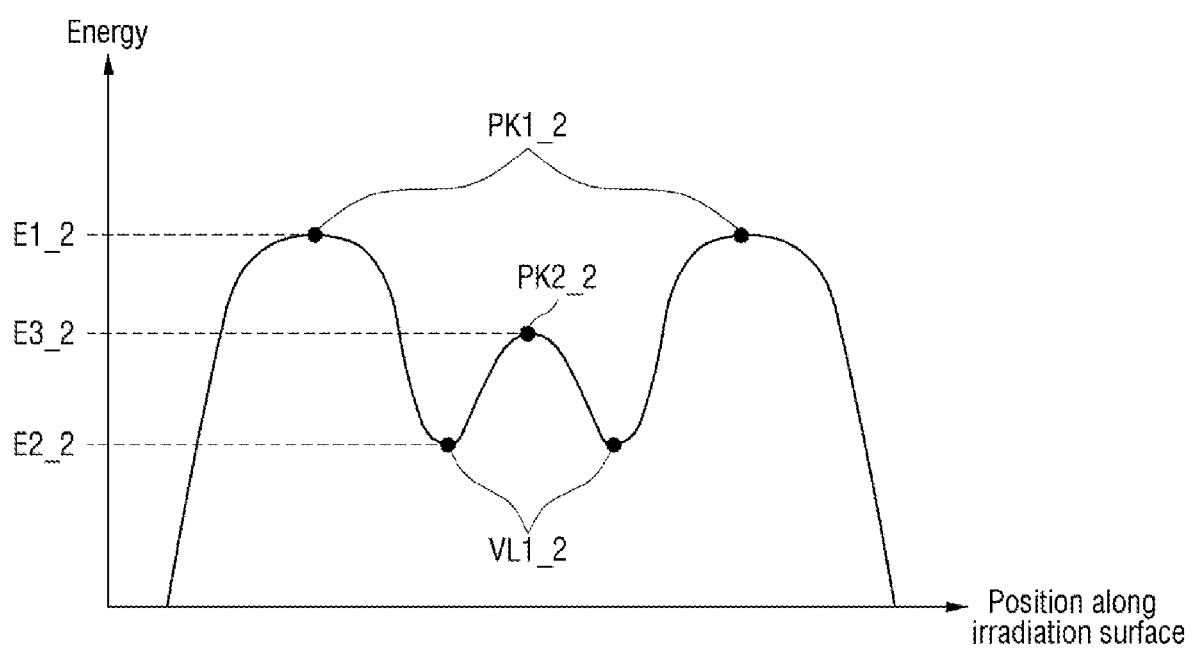
FIG. 19 is a graph illustrating the energy profile of a cross section taken along line XIXa-XIXa' or XIXb-XIXb' of FIG. 18.

FIG. 18 is a diagram illustrating a planar shape of a laser beam spot according to still another embodiment. FIG. 19 is a graph illustrating the energy profile of a cross section taken along line XIXa-XIXa' or XIXb-XIXb' of FIG. 18.

Referring to FIGS. 18 and 19, the apparatus DD for manufacturing a display device according to the present embodiment may form an energy profile having a shape different from that of the laser beam spot LBS according to one embodiment. The laser beam spot LBS_2 according to the present embodiment has a circular shape that is the same as that of the laser beam spot LBS according to one embodiment, but differs from the laser beam spot LBS according to one embodiment in that energy increases, decreases, and increases again when moving from an outer edge of the laser beam spot LBS_2 to its center.

Specifically, the laser beam spot LBS_2 according to the present embodiment may exhibit an energy profile with a first peak PK1_2 at a maximum energy E1_2 as energy increases when moving from an outer edge of the laser beam spot LBS_2 toward its center, a relative minimum point VL1_2 at a relative minimum energy E2_2 as energy decreases when moving further to the center, and a second peak PK2_2 at a relative maximum energy E32 as energy again increases when moving further to the center. The relative maximum energy E3_2 at the center may be less than the maximum energy E1_2.

The apparatus DD for manufacturing a display device according to the present embodiment may include the first optical system OS1 to control the energy profile of the laser beam LB. By doing so, when irradiation is performed with the laser beam LB, excessive energy may be prevented from being applied to the irradiation target. In addition, when the laser beam LB is moved to perform irradiation, uniform energy may be provided to the irradiation target for each area.

The apparatus DD for manufacturing a display device according to the present embodiment may perform irradiation using the laser beam LB so that the first irradiation surface PL1 is positioned inside the protective film PF. This may provide for partial peeling of the protective film PF, including the film portion FL and the adhesive portion AD, attached to the base substrate SUB, so that the film portion FL and the adhesive portion AD may be penetrated in a thickness direction. In this case, the energy of the laser beam LB may be controlled to prevent damage to the base substrate SUB disposed under the protective film PF.

In addition, the apparatus DD for manufacturing a display device according to the present embodiment has a predetermined relative maximum energy at the center of the laser beam spot LBS_2 that forms a relative maximum in the energy profile, so that when the size of the laser beam spot LBS_2 increases, the energy provided at the center of a line in which irradiation is performed with the laser beam LB may be increased when the laser beam LB is moved, and thus uniform energy may be provided for each area of the line in which irradiation is performed with the laser beam LB.

In concluding the detailed description, those skilled in the art will appreciate that many variations and modifications can be made to the embodiments without substantially departing from the principles of the present invention. Therefore, the disclosed embodiments of the invention are used in a generic and descriptive sense only and not for purposes of limitation.

What is claimed is:

1. An apparatus for manufacturing a display device, comprising:
   a laser module configured to provide a laser beam to a beam shaper; and
   the beam shaper,
   wherein the beam shaper is configured to:
      control a first energy profile of the laser beam and a second energy profile of the laser beam;
      provide the laser beam to a first irradiation surface according to the first energy profile; and
      provide the laser beam to a second irradiation surface different from the first irradiation surface according to the second energy profile, wherein the second irradiation surface is parallel to the first irradiation surface,
   wherein, between the apparatus and the first irradiation surface, the laser beam consists of a first portion, a second portion, and a focal point separating the first portion and the second portion, the first portion and the second portion omitting one or more focal points of the laser beam, wherein the second irradiation surface is disposed between the focal point of the laser beam and the first irradiation surface, wherein the first energy profile includes a first relative minimum energy at a perimeter of the laser beam, a second relative minimum energy at a center of the laser beam, and a first relative maximum energy at a point on the first irradiation surface between the perimeter of the laser beam and the center of the laser beam, wherein the second relative minimum energy is zero, and wherein the second energy profile includes a third relative minimum energy at the perimeter of the laser beam, a second relative maximum energy at the center of the laser beam, a fourth relative minimum energy at a first point on the second irradiation surface between the center of the laser beam and the perimeter of the laser beam, and a third relative maximum energy at a second point on the second irradiation surface between the perimeter of the laser beam and the first point on the second irradiation surface.

2. The apparatus of claim 1, wherein the second relative maximum energy is greater than the third relative maximum energy.

3. The apparatus of claim 1, wherein a distance between the focal point and a point on the irradiation surface that is overlapped by the focal point is from about 4.7 mm to about 5.3 mm.

4. The apparatus of claim 1, wherein the laser beam moves along a direction of movement and a plurality of laser beam spots overlap on the irradiation surface, forming a laser beam line, wherein the laser beam line includes a first edge, a second edge, a center disposed between the first edge and the second edge, a first point disposed between the first edge and the center, and a second point disposed between the center and the second edge, wherein an energy profile of the laser beam line consists of a first section, a second section, and a third section, wherein the first section corresponds to relative movement from the first edge towards the first point, the second section corresponds to relative movement from the first point towards the second point, and the third section corresponds to relative movement from the second point to the second edge, wherein, in the first section, the energy profile of the laser beam line increases from a first value to a second value, wherein, in the second section, the energy profile of the laser beam line is constant at the second value, and wherein, in the third section, the energy profile of the laser beam line decreases from the second value to a third value.

5. The apparatus of claim 4, wherein an area of the first section is smaller than an area of the second section.

6. The apparatus of claim 4, wherein a first laser beam spot of the plurality of laser beam spots overlaps a second laser beam spot of the plurality of laser beam spots by 80% or more.

7. The apparatus of claim 4, wherein a laser beam spot of the plurality of laser beam spots comprises a donut shape.

8. The apparatus of claim 1, further comprising one or more mirrors, wherein the laser beam is provided to the one or more mirrors via the beam shaper, and wherein the one or more mirrors control an optical path of the laser beam.

9. The apparatus of claim 8, wherein the one or more mirrors scan the laser beam.

10. The apparatus of claim 8, further comprising a lens, wherein the laser is provided to the lens via the one or more mirrors, and wherein the lens controls a shape of a focal plane of the laser beam.

11. The apparatus of claim 10, wherein the shape of the focal plane of the laser beam is flat.

12. The apparatus of claim 1, wherein the second relative maximum energy is greater than the first relative maximum energy.

13. A method for manufacturing a display device, comprising:

preparing a laser device including a beam shaper and a laser module configured to provide a laser beam to the beam shaper, wherein the beam shaper is configured to:
control a first energy profile of the laser beam and a second energy profile of the laser beam,
provide the laser beam to a first irradiation surface according to the first energy profile, and
provide the laser beam to a second irradiation surface different from the first irradiation surface according to the second energy profile, wherein the second irradiation surface is parallel to the first irradiation surface;

preparing a substrate to which a protective film including a film portion and an adhesive portion is attached;

providing the laser beam to the second irradiation surface according to the second energy profile; and forming an active area of the protective film and a dummy area of the protective film by irradiating a laser beam from the laser device through the protective film at the first irradiation surface according to the first energy profile, wherein the irradiating removes the film portion and the adhesive portion, wherein, between the apparatus and the first irradiation surface, the laser beam consists of a first portion, a second portion, and a focal point separating the first portion and the second portion, the first portion and the second portion omitting one or more focal points of the laser beam, wherein the second irradiation surface is disposed between the focal point of the laser beam and the first irradiation surface, wherein the first energy profile includes a first relative minimum energy at a perimeter of the laser beam, a second relative minimum energy at a center of the laser beam, and a first relative maximum energy at a point on the first irradiation surface between the perimeter of the laser beam and the center of the laser beam, wherein the second relative minimum energy is zero, wherein the second energy profile includes a third relative minimum energy at the perimeter of the laser beam, a second relative maximum energy at the center of the laser beam, a fourth relative minimum energy at a first point on the second irradiation surface between the center of the laser beam and the perimeter of the laser beam, and a third relative maximum energy at a second point on the second irradiation surface between the perimeter of the laser beam and the first point on the second irradiation surface, and wherein the dummy area of the protective film is configured to be peeled from the substrate.

14. The method of claim 13, further comprising:

irradiating the laser beam to an irradiation surface disposed inside the protective film, wherein a focal point of the laser beam is disposed between the laser device and the irradiation surface.

15. The method of claim 13, further comprising:
irradiating the laser beam along a film cutting line.

16. The method of claim 13, further comprising:
forming a cutting groove by irradiating the laser beam from the laser device through the protective film onto the substrate, wherein the active area of the protective film and the dummy area of the protective film are separated by the cutting groove.

17. The method of claim 16, wherein:
a cross-section of the cutting groove comprises a convex parabolic shape.

* * * * *